United States Patent
Yoon et al.

(10) Patent No.: US 8,295,279 B2
(45) Date of Patent: Oct. 23, 2012

(54) ROUTING METHOD AND APPARATUS FOR PROVIDING DIFFERENT PATH BY SERVICE

(75) Inventors: Seung Hyun Yoon, Daejeon (KR); Hyung Seok Chung, Daejeon (KR); Sun Me Kim, Daejeon (KR); Byung Jun Ahn, Daejeon (KR); You Hyeon Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 372 days.

(21) Appl. No.: 12/570,386

(22) Filed: Sep. 30, 2009

(65) Prior Publication Data

US 2010/0135300 A1    Jun. 3, 2010

(30) Foreign Application Priority Data

Dec. 2, 2008  (KR) .................. 10-2008-0121237
Mar. 9, 2009  (KR) .................. 10-2009-0019880

(51) Int. Cl.
 *H04L 12/28* (2006.01)
(52) U.S. Cl. ....................................... 370/389
(58) Field of Classification Search .......... None
See application file for complete search history.

(56) References Cited

U.S. PATENT DOCUMENTS

| | | | |
|---|---|---|---|
| 6,590,867 B1 | 7/2003 | Ash et al. | |
| 6,697,363 B1 * | 2/2004 | Carr | 370/389 |
| 6,950,398 B2 * | 9/2005 | Guo et al. | 370/235 |
| 6,956,821 B2 * | 10/2005 | Szviatovszki et al. | 370/237 |
| 6,973,057 B1 * | 12/2005 | Forslow | 370/328 |
| 7,123,620 B1 | 10/2006 | Ma | |
| 7,215,639 B2 * | 5/2007 | De Maria et al. | 370/235 |
| 7,787,442 B2 * | 8/2010 | Akahane et al. | 370/352 |
| 2005/0025055 A1 * | 2/2005 | Jain et al. | 370/235 |
| 2008/0304424 A1 | 12/2008 | Gourlaouen et al. | |
| 2010/0135300 A1 * | 6/2010 | Yoon et al. | 370/392 |

FOREIGN PATENT DOCUMENTS

| | | |
|---|---|---|
| CN | 1612562 | 5/2005 |
| KR | 1020050052879 | 6/2005 |
| KR | 1020060031507 | 4/2006 |
| KR | 1020060084747 | 7/2006 |
| KR | 1020070061071 | 6/2007 |

* cited by examiner

*Primary Examiner* — Robert Wilson
(74) *Attorney, Agent, or Firm* — Nelson Mullins Riley & Scarborough LLP; EuiHoon Lee, Esq.

(57) ABSTRACT

Disclosed is a routing method and apparatus for providing a different path by service. The routing method includes determining a service identification (ID) indicating a service requested by a packet by using a header in the packet; and searching for a service forwarding table corresponding to the service ID from a plurality of service forwarding tables storing different next hops by service and determining the packet's next hop.

9 Claims, 4 Drawing Sheets

ROUTING METHOD AND APPARATUS FOR PROVIDING DIFFERENT PATH BY SERVICE

CROSS-REFERENCE TO RELATED APPLICATIONS

This application claims the priority of Korean Patent Application No. 2008-0121237 filed on Dec. 2, 2008 and Korean Patent Application No. 2009-0019880 filed on Mar. 9, 2009, in the Korean Intellectual Property Office, the disclosure of which is incorporated herein by reference.

BACKGROUND OF THE INVENTION

1. Field of the Invention

The present invention relates to a routing method and apparatus for providing a different path by service, and more particularly, to a routing method and apparatus for determining a packet's next hop separately by service by identifying a service for a corresponding packet.

2. Description of the Related Art

Recently, many communications services have been changed into Internet-Protocol (IP)-based services. An IP communication network is configured based on routers, which determine a next hop by the use of routing protocol switching with regard to a specific destination IP address.

In the related art IP communication networks, packets with an identical destination IP address are transferred via the same path due to the configuration of the network and the forwarding function of routers, except for a special occasion such as the application of a load balancing function. Accordingly, premium IP traffic and best-effort IP traffic are transferred via the same path, causing degradation in quality due to interference or the like. To prevent this degradation, a premium IP service network is being separately configured and managed within the current network. Also, a network is being operated in such a manner that a specific terminal is used and a separate IP is assigned for a specific service, such as Voice over Internet Protocol (VoIP), Video on Demand (VOD) or Internet Protocol Television (IPTV).

Therefore, in IP services, a single terminal, as a multifunctional terminal providing both premium services and best-effort services, needs to have a function that provides Quality of Service (QoS) by service session or IP flow. Also, if necessary, a router needs to be able to determine a different path by service, that is, a different next hop by service even if the destination IP address is the same.

However, current technologies provide premium IP services only when a separate premium network is built and a separate terminal and a separate IP address are assigned.

SUMMARY OF THE INVENTION

An aspect of the present invention provides a routing method and apparatus for providing a different path by service, capable of determining a packet's next hop separately by service by identifying a service corresponding to a packet.

According to an aspect of the present invention, there is provided a routing apparatus for providing a different path by service, including: a service identification module determining a service identification (ID) indicating a service requested by a packet by using a header in the packet; a plurality of service forwarding tables storing a different next hop by service ID; and a hop search module searching for a service forwarding table corresponding to the service ID from the plurality of service forwarding tables and determining the packet's next hop based on the service ID.

According to another aspect of the present invention, there is provided a routing method for providing a different path by service, including: determining a service identification (ID) indicating a service requested by a packet by using a header in the packet; and searching for a service forwarding table corresponding to the service ID from a plurality of service forwarding tables storing different next hops by service, and determining the packet's next hop.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. Moreover, detailed descriptions related to well-known functions or configurations will be ruled out in order not to unnecessarily obscure subject matters of the present invention.

Figure 1:
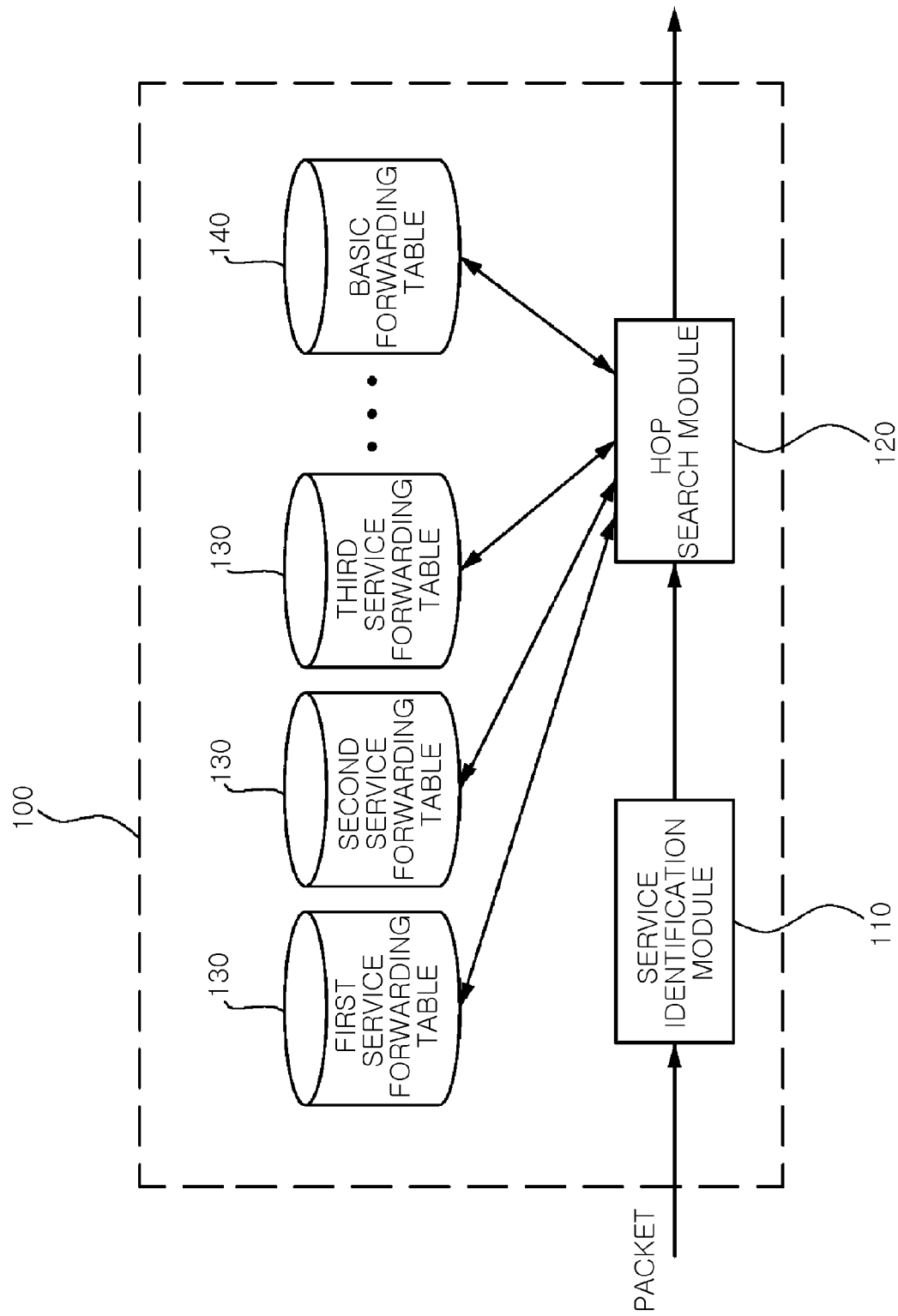
FIG. 1 is a schematic block diagram illustrating the internal configuration of a routing apparatus for providing a different path by service according to an exemplary embodiment of the present invention.

FIG. 1 is a schematic block diagram illustrating the internal configuration of a routing apparatus for providing a different path by service, according to an exemplary embodiment of the present invention.

Referring to FIG. 1, a routing apparatus 100 according to an exemplary embodiment of the present invention includes a service identification module 110, a hop search module 120 and a plurality of service forwarding tables 130.

The service identification module 110 determines a service identification (ID) indicating a service requested by a packet, by using a header in the packet. In detail, the service identification module 110 determines a service ID by information contained in an Internet Protocol (ID) header of a packet or a combination of information contained in the IP header. Alternatively, the service identification module 110 determines a service ID by a combination of information contained in a Transmission Control Protocol (TCP)/User Datagram Protocol (UDP) header of a packet and information contained in an IP header of the packet.

Also, the service identification module 110 determines a service ID by assigning or canceling a service identification criterion by service session and in flow units in a network and service control layer (e.g., Resource and Admission Control Functions (RACF). For example, a service ID is determined in the flow of units of a 5-tuple.

The plurality of service forwarding tables 130 store difference next hops by service ID such as voice communication, Voice over Internet Protocol (VoIP), Video on Demand (VOD), IPTV or the like.

The hop search module 120 searches for a service forwarding table corresponding to the service ID from the plurality of service forwarding tables 130, thereby determining the packet's next hop.

The routing apparatus 100, according to the exemplary embodiment of the present invention, further includes a basic forwarding table 140 storing a next hop preset by an operator or a network management system. If a service forwarding table corresponding to the service ID is absent at the time of the determination of the packet's next hop, the hop search module 120 searches the basic forwarding table 140 and determines the packet's next hop.

Also, the routing apparatus 100, according to the exemplary embodiment of the present invention, assigns the routing information of the plurality of service forwarding tables 130 through an operator or a network management system by a provisioning method. Alternatively, the routing information is exchanged by combining IP address information with a service that can be routed between routers.

Figure 2:
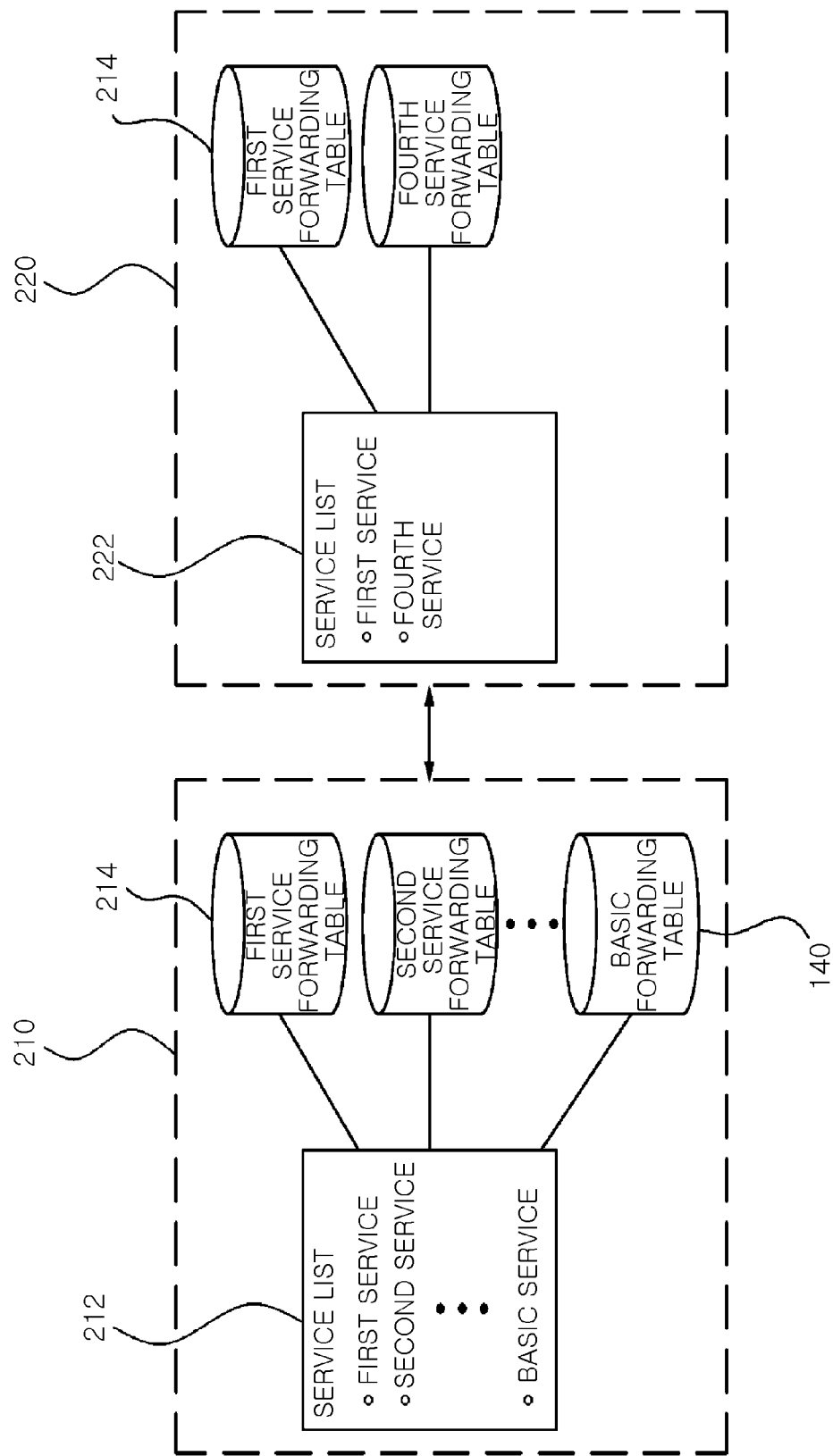
FIG. 2 is a view illustrating a method of exchanging routing information by service between routing apparatuses according to an exemplary embodiment of the present invention.

FIG. 2 illustrates a method of exchanging routing information by service between routing apparatuses according to an exemplary embodiment of the present invention.

Referring to FIG. 2, a first routing apparatus 210 provides a first service, a second service and a basic service, and a second routing apparatus 220 provides a first service and a fourth service. In this case, the first routing apparatus 210 and the second routing apparatus 220 provide the first service in common, and thus update their first service forwarding tables 214 by exchanging routing information in the respective first service forwarding tables 214 associated with the first service. When routing information regarding a service, which is absent from service lists 212 and 222, is received via a routing protocol, each routing apparatus ignores the routing information. In contrast, when routing information regarding a service, which exists in the service lists 212 and 222, is received, each routing apparatus updates its service forwarding table to provide a next hop for the associated service.

In FIGS. 1 and 2, a basic forwarding table 140 corresponding to the basic service may store a path for providing a best-effort service in an existing IP network, or a backup path. If a service forwarding table corresponding to a service ID is absent in determining the packet's next hop, the packet's next hop is determined by searching the basic forwarding table 140.

Figure 3:
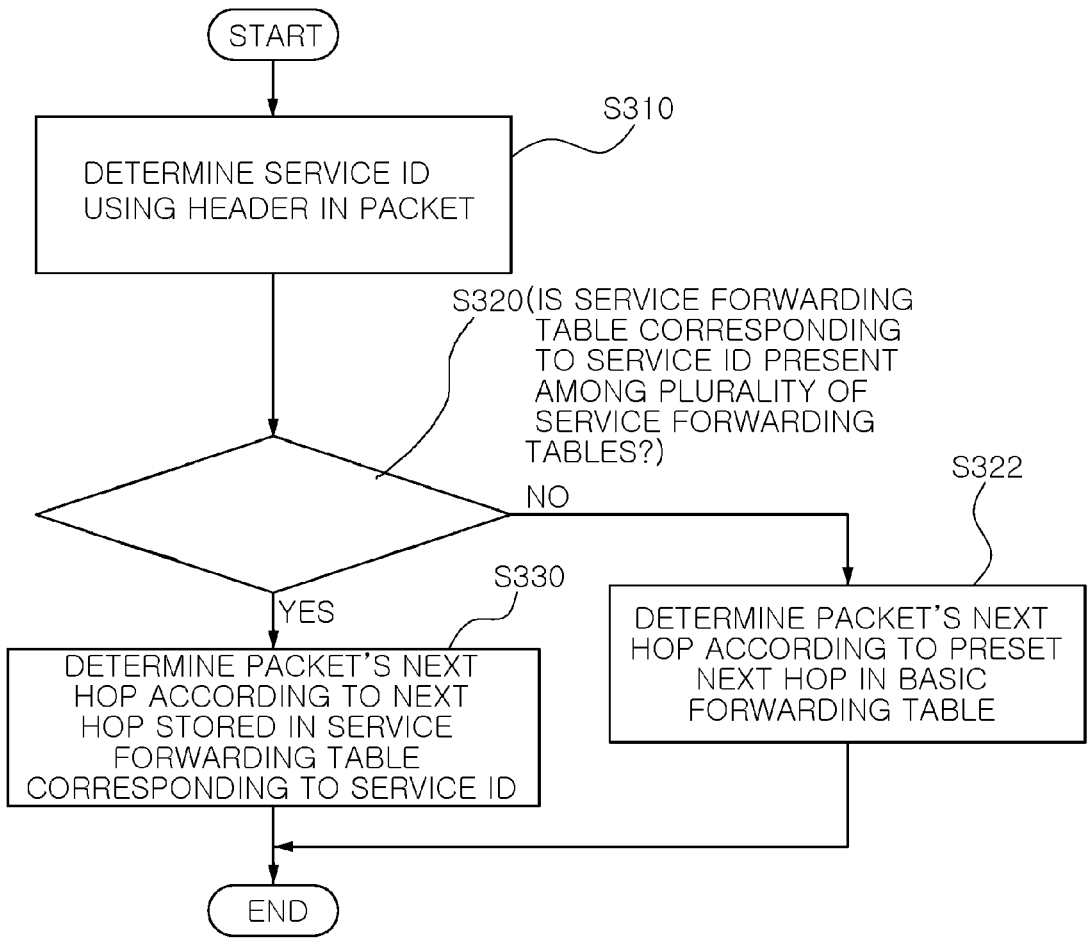
FIG. 3 is a flowchart illustrating a routing method for providing a different path by service according to an exemplary embodiment of the present invention.

FIG. 3 is a flowchart illustrating a routing method for providing a different path by service, according to an exemplary embodiment of the present invention.

Referring to FIG. 3, a service identification module 110 determines a service ID indicating a service requested by a packet by using a header in the packet in operation S310. The service identification module 110 determines a service ID by information contained in an IP header in a packet or a combination of information contained in the IP header. Alternatively, the service identification module 110 determines a service ID by the combination of information contained in a TCP/UDP header in a packet and information contained in an IP header in the packet. Alternatively, the service identification module determines a service ID based on a service identification criterion regarding the service ID, wherein the service identification criterion by service session and flow is assigned or canceled by a network and service control layer.

Thereafter, the hop search module 120 determines whether a service forwarding table corresponding to the service ID is present among the plurality of service forwarding tables 130 in operation S320. If a service forwarding table corresponding to the service ID exists among the plurality of service forwarding tables 130, the hop search module 120 determines the packet's next hop according to a next hop stored in the service forwarding table corresponding to the service ID in operation S330.

If a service forwarding table corresponding to the service ID does not exist among the plurality of service forwarding tables 130, the hop search module 120 determines the packet's next hop according to a preset next hop in the basic forwarding table 140 in operation S322.

Figure 4:
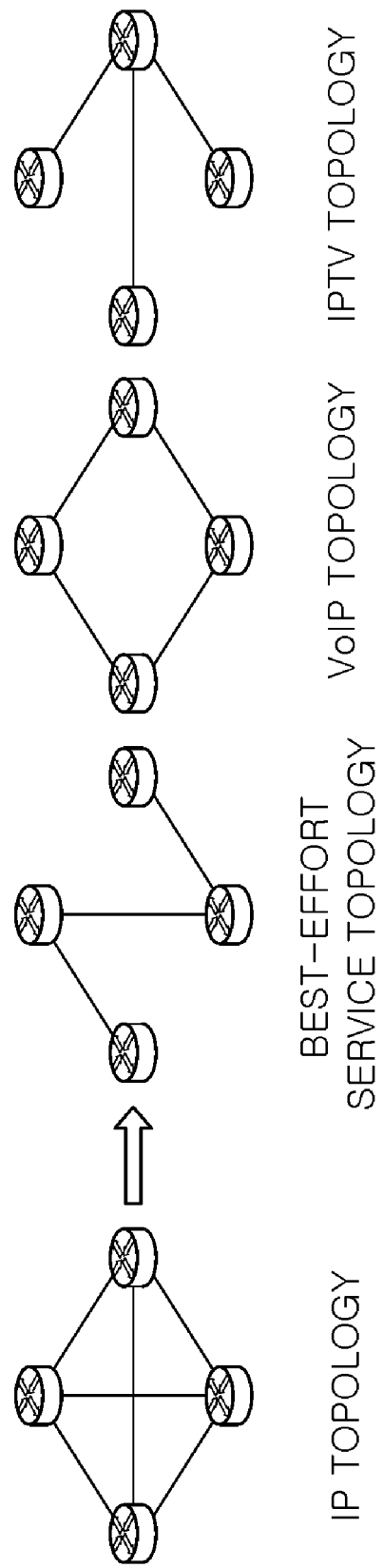
FIG. 4 illustrates an application example of a routing method by service according to the present invention.

FIG. 4 is an application example of a routing method by service according to an exemplary embodiment of the present invention.

As shown in FIG. 4, even though there is one IP topology, it acts variously as if a separate network topology exists in an L4/session layer. This contributes to increasing user satisfaction by service.

As set forth above, according to exemplary embodiments of the invention, separate topologies are configured for various services by using a single router, thereby reducing inefficiency of building a separate routing network for each service in the related art. Also, a situation in which a single terminal provides various services can be easily handled.

While the present invention has been shown and described in connection with the exemplary embodiments, it will be apparent to those skilled in the art that modifications and variations can be made without departing from the spirit and scope of the invention as defined by the appended claims.

What is claimed is:

1. A routing apparatus for providing a different path by service, the routing apparatus comprising:
   a first processor executing a service identification module which determines a service identification (ID) indicating a service requested by a packet by using a header in the packet;
   a plurality of service forwarding tables storing a different next hop by service ID; and
   a second processor executing a hop search module which searches a service forwarding table corresponding to the service ID from the plurality of service forwarding tables and determines the packet's next hop based on the service ID.

2. The routing apparatus of claim 1, wherein the service identification module determines the service ID by information contained in an Internet Protocol (IP) header in the packet or a combination of information contained in the IP header.

3. The routing apparatus of claim 1, wherein the service identification module determines the service ID by a combination of information contained in a Transmission Control Protocol (TCP)/User Datagram Protocol (UDP) header in the packet and information contained in an Internet Protocol (IP) header in the packet.

4. The routing apparatus of claim 1, wherein the service identification module determines the service ID based on a service identification criterion regarding the service ID, wherein the service identification criterion by service session and flow is assigned or canceled by a network and service control layer.

5. The routing apparatus of claim 1, wherein when a plurality of routing apparatuses providing the same service are present, routing information in their respective service forwarding tables associated with the same service is exchanged via a routing protocol between the plurality of routing apparatuses.

6. A routing method for providing a different path by service, the routing method comprising:
   determining a service identification (ID) indicating a service requested by a packet by using a header in the packet; and searching for a service forwarding table corresponding to the service ID from a plurality of service forwarding tables storing different next hops by service ID, and determining the packet's next hop based on the service ID.

7. The routing method of claim 6, wherein the determining of the service ID comprises determining the service ID by information contained in an Internet Protocol (IP) header in the packet or a combination of information contained in the IP header.

8. The routing method of claim 6, wherein the determining of the service ID comprises determining the service ID by a combination of information contained in a Transmission Control Protocol (TCP)/User Datagram Protocol (UDP) header in the packet and information contained in an Internet Protocol (IP) header in the packet.

9. The routing method of claim 6, wherein the determining of the service ID comprises determining the service ID based on a service identification criterion regarding the service ID, wherein the service identification criterion by service session and flow is assigned or canceled by a network and service control layer.

* * * * *